United States Patent
Suzuki et al.

(10) Patent No.: US 7,593,179 B2
(45) Date of Patent: Sep. 22, 2009

(54) CONTROL APPARATUS, STORAGE APPARATUS, AND WRITING CONTROL METHOD

(75) Inventors: Atsushi Suzuki, Higashine (JP); Yukio Abe, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/105,868

(22) Filed: Apr. 18, 2008

(65) Prior Publication Data
US 2008/0291565 A1 Nov. 27, 2008

(30) Foreign Application Priority Data
May 21, 2007 (JP) ............... 2007-134681

(51) Int. Cl.
*G11B 21/02* (2006.01)
(52) U.S. Cl. ...................................... 360/75
(58) Field of Classification Search ............ 360/75, 360/31, 69, 70, 256.3; 709/231; 714/48
See application file for complete search history.

(56) References Cited

U.S. PATENT DOCUMENTS

| | | | | |
|---|---|---|---|---|
| 4,807,071 A | * | 2/1989 | Kosaka et al. | 360/256.3 |
| 5,196,968 A | * | 3/1993 | Dietz et al. | 360/69 |
| 5,654,841 A | * | 8/1997 | Hobson et al. | 360/75 |
| 5,963,388 A | * | 10/1999 | Yoshida et al. | 360/70 |
| 6,344,942 B1 | * | 2/2002 | Yarmchuk | 360/75 |
| 6,546,426 B1 | * | 4/2003 | Post | 709/231 |
| 7,079,337 B2 | * | 7/2006 | Tokizono et al. | 360/31 |
| 2004/0075934 A1 | * | 4/2004 | Tan et al. | 360/75 |
| 2006/0139790 A1 | | 6/2006 | Iseri et al. | |
| 2008/0126882 A1 | * | 5/2008 | Fulton et al. | 714/48 |

FOREIGN PATENT DOCUMENTS

| | | |
|---|---|---|
| JP | A 2000-322812 | 11/2000 |
| JP | A 2006-185504 | 7/2006 |

* cited by examiner

*Primary Examiner*—Fred Tzeng
(74) *Attorney, Agent, or Firm*—Greer, Burns & Crain, Ltd.

(57) ABSTRACT

A control apparatus detects positional information of a head performing writing processing every predetermined time interval, and computes next-sample projected positional information of the head based on the difference between the positional information detected the previous time and the positional information detected the current time, and the current detected positional information for every position information detected. The control apparatus determines whether the computed next-sample projected positional information is greater than a next-sample projected position threshold which is a predetermined threshold. Following this, in the case that determination is made that the next-sample projected positional information is greater than the projected position threshold, the disk control apparatus controls a storage device to stop the writing processing after the writing processing is performed through the end of the sector wherein the writing processing is currently being performed.

9 Claims, 9 Drawing Sheets

FIG.9

CONTROL APPARATUS, STORAGE APPARATUS, AND WRITING CONTROL METHOD

BACKGROUND

1. Field of the Technique

The present technique relates to a control apparatus, a storage apparatus, and writing control method in the event of performing writing of data as to a storage medium.

2. Description of the Related Art

Heretofore, a disk control apparatus which controls a storage device for the purpose of performing accurate writing processing while the storage device such as a disk device is in a vibrating state detects vibration, and in the case vibration is detected, a technique to control the writing processing is performed.

For example, a technique is disclosed in Japanese Laid-open Patent Application Publication No. 2006-185504 wherein, in the case that the disk control apparatus detects vibration, the writing processing is immediately stopped, a writing processing inhibiting period of the disk device is determined according to the magnitude of detected vibration, and the disk control apparatus performs control such that the writing processing is inhibited during the writing processing inhibiting period. Note that a technique is disclosed in Japanese Laid-open Patent Application Publication No. 2000-322812, in the case that the disk control apparatus detects vibration, wherein the disk control apparatus varies calculation for the control amount of an actuator according to the magnitude of detected vibration.

Incidentally, with the technique in the above-mentioned Japanese Laid-open Patent Application Publication No. 2006-185504, in the case that the disk control apparatus detects vibration, the writing processing during the writing processing inhibiting period is inhibited, whereby problems have occurred such as requiring time for rewriting at the time power is turned on when restarting in the case that vibration is detected partway through a sector so the writing processing in sector stops partway through, or a time delay occurring when turning the power on, or generating unrecovered sectors in the case that an unrecovered reading sector occurs.

SUMMARY

It is an object of the present technique to prevent the generation of unrecovered sectors by preventing writing splicing.

According to an embodiment, a control apparatus for controlling a storage device performs writing processing to write data into a storage medium by a head.

And the control apparatus detects positional information of the head performing writing processing every predetermined time interval. And when the control apparatus determines the positional information is not greater than a position threshold, the control apparatus computes next-sample projected positional information of the head based on the difference between the positional information detected the previous time and the positional information detected the current time. When the control apparatus determines the next-sample projected positional information is greater than next-sample projected position threshold, the control apparatus controls a disk device to stop the writing processing after the writing processing is performed through the end of the sector wherein the writing processing is currently being performed.

DESCRIPTION OF THE PREFERRED EMBODIMENTS

Embodiments of a control apparatus, a storage device, and writing control method will be described in detail with reference to the appended diagrams.

The embodiments below sequentially describe the schematics and features of the control apparatus relating to a first embodiment and the configuration and process flow of the control apparatus, and finally describe the advantages of the first embodiment. Note that hereafter, description is given for a control apparatus having a function (sector boundary function) wherein, in the event vibration or the like occurring in a disk device, the writing processing is not stopped immediately, but rather the writing processing is stopped after performing writing processing up to the end of a sector (sector boundary) wherein writing processing is performed.

(Schematics and Features of Control Apparatus)

Figure 1:
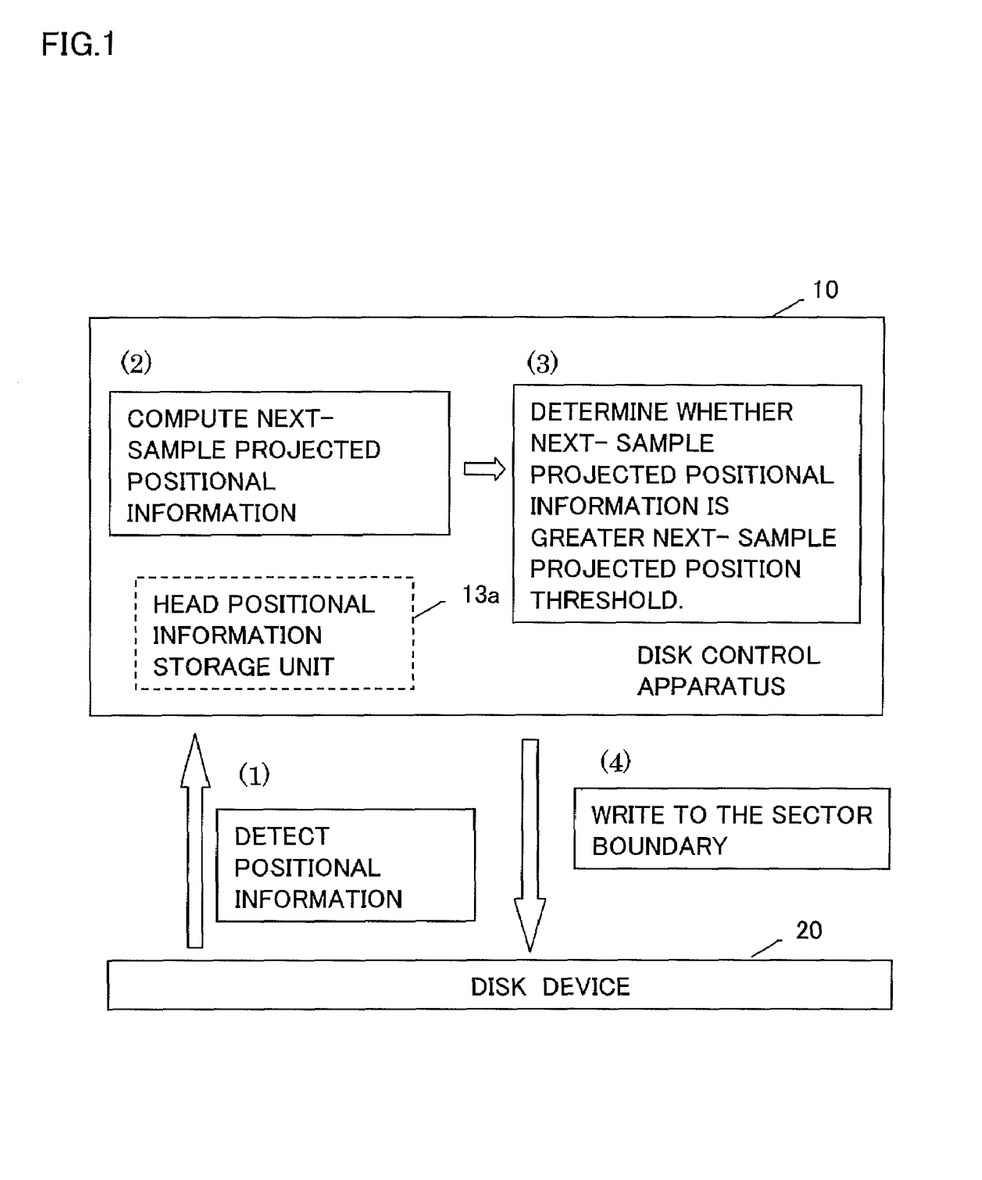
FIG. 1 is a diagram to describe the schematics and characteristics of a disk control apparatus.

First, the schematics and features of the control apparatus relating to the first embodiment will be described with reference to FIG. 1. FIG. 1 is a diagram describing the schematics and features of the disk control apparatus 10 as the control apparatus relating to the first embodiment.

A disk control apparatus 10 detects, every predetermined time interval, positional information of a head performing the writing processing (see (1) in FIG. 1), and for each positional information detected, the difference between the positional information detected the previous time and the positional information detected the current time, and the positional information detected the current time are employed to compute a next-sample projected positional information of the head (see (2) in FIG. 1). Specifically, the disk control apparatus 10 detects the positional information of the head from a position signal indicating the position of the head performing the writing processing and stores this in a head positional information storage unit 13a, and also stores the next-sample projected positional information of the head in the head positional information storage unit 13a.

The disk control apparatus 10 determines whether the computed next-sample projected positional information is greater than next-sample projected position threshold which is a predetermined threshold (see (3) in FIG. 1). Specifically, the disk control apparatus 10 determines whether the positional information stored in the head positional information storage unit 13a is greater than the position threshold which is the predetermined threshold, and in the case that the positional information is the same or smaller than the position threshold, the disk control apparatus 10 determines whether the next-sample projected positional information is greater than the next-sample projected position threshold.

That is to say, in the case the positional information exceeds the position threshold, we can say a shock has occurred to the disk device 20. The disk control apparatus 10 controls the disk device 20, so as not to continue to perform the writing processing up to the sector boundary, wherein there is risk of shifted writing, but rather immediately stops the writing processing even if only partway through a sector.

In the event that the disk control apparatus 10 determines that next-sample projected positional information is greater than the next-sample projected position threshold, writing processing is performed up to the end of the sector wherein writing processing is currently performed, following which the disk device is controlled so as to stop the writing processing (see (4) in FIG. 1). Specifically, in the event that the disk control apparatus 10 determines that the positional information is the same or smaller than the position threshold, and that the next-sample projected positional information is greater than the next-sample projected position threshold, we can say that vibration has occurred, and the disk device 20 is controlled so as to stop the writing processing at a sector boundary.

Thus, the disk control apparatus 10 ends the writing processing in sector to prevent writing splicing, whereby writing processing is ended in sector to prevent writing splicing, whereby great increases to unrecovered sectors in a user area can be prevented. Also, with a system area wherein information relating to the operation of the disk device 20 is stored, unrecovered sectors can be prevented, whereby device startup time delays when turning the power due to retries can be prevented.

(Disk Control Apparatus Configuration)

Figure 2:
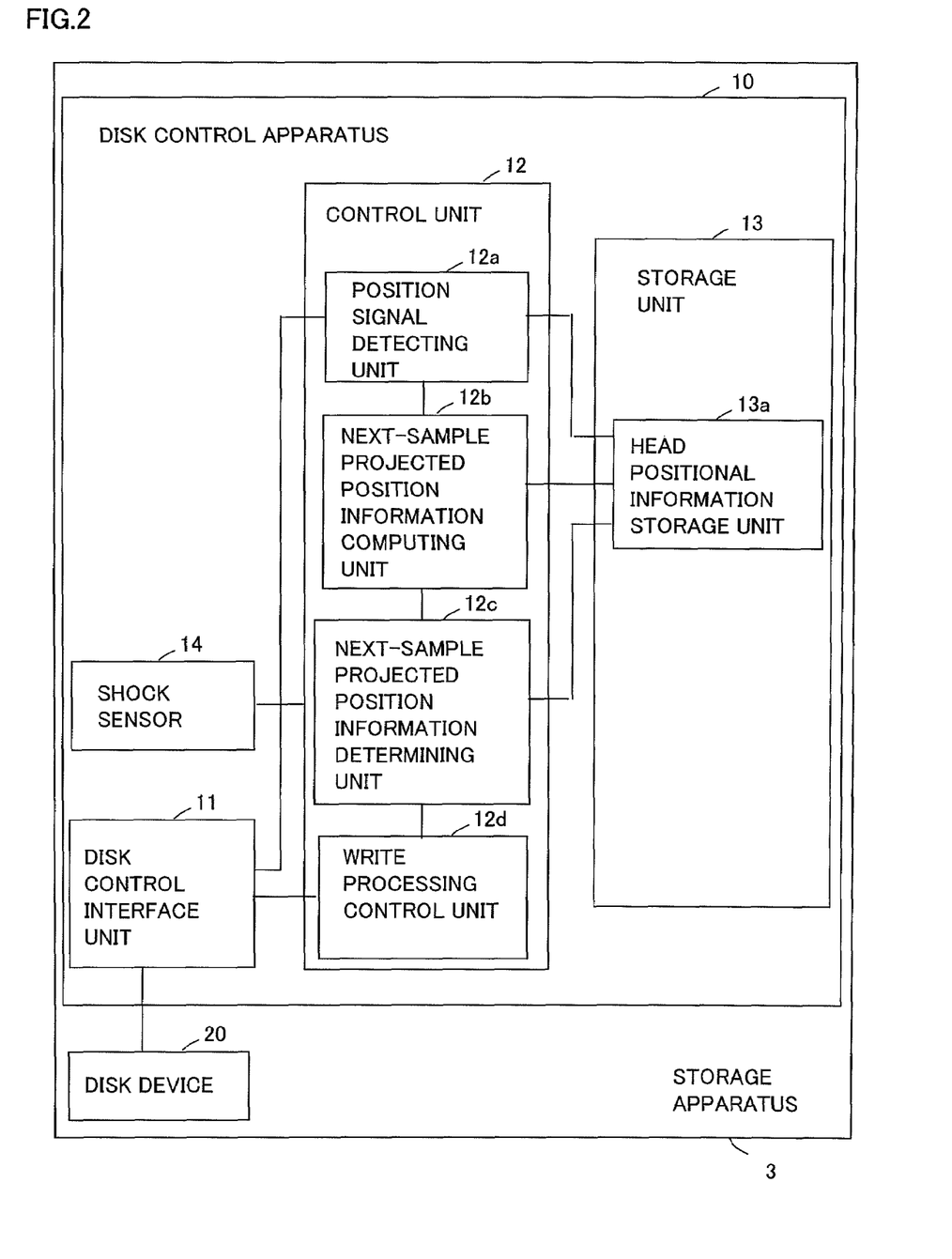
FIG. 2 is a block diagram to illustrate the configuration of a disk control apparatus.
Figure 3:
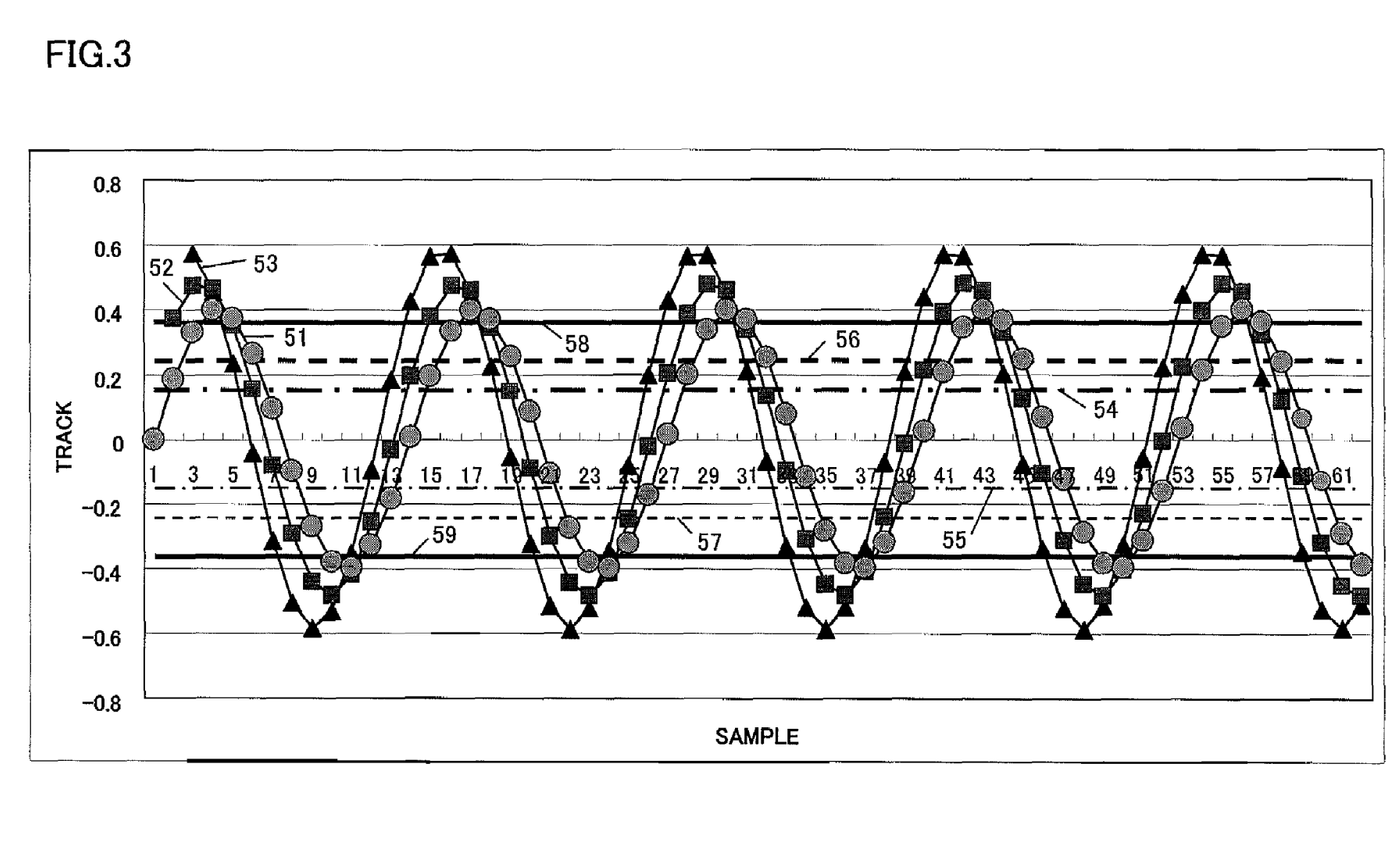
FIG. 3 is a diagram to describe positional information of a head and next-sample projected positional information.
Figure 4:
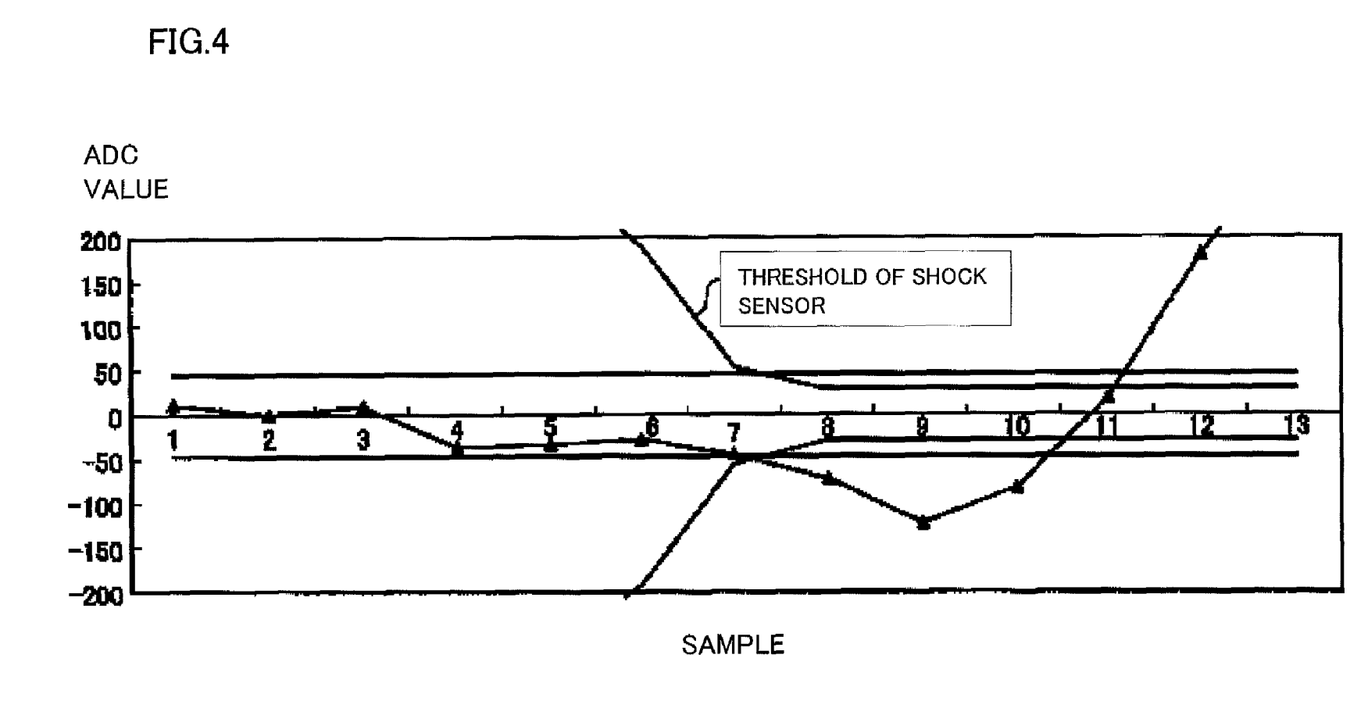
FIG. 4 is a diagram to describe a shock sensor.
Figure 5:
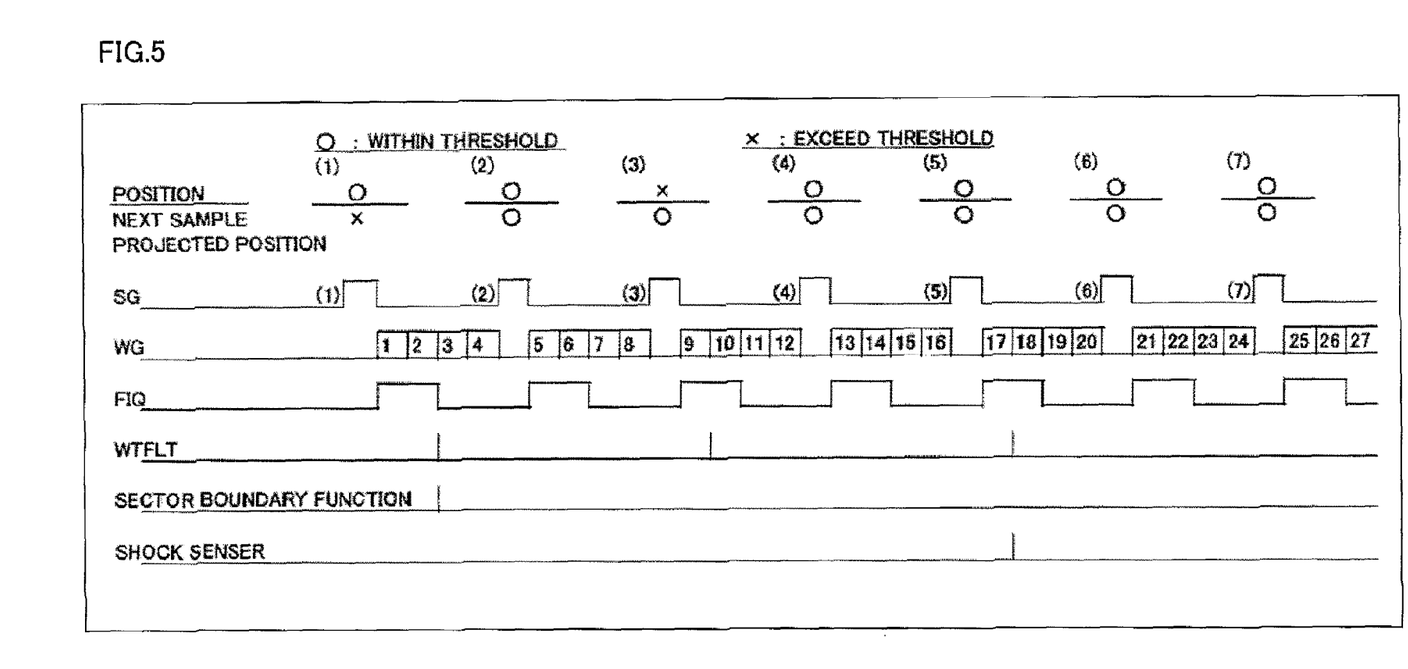
FIG. 5 is a diagram to describe the processing operation.

Next, the configuration of the disk control apparatus 20 will be described with reference to FIG. 2. FIG. 2 is a block diagram to illustrate the configuration of the disk control apparatus 10, FIG. 3 is a diagram to describe the positional information of a head and the next-sample projected positional information thereof, FIG. 4 is a diagram to describe a shock sensor 14, and FIG. 5 is a diagram to describe the writing processing.

As shown in FIG. 2, a storage device 3 includes the disk control apparatus 10 and the disk device 20. The disk device 20 writes data into a predetermined sector of a storage medium by the head, according to the control of the disk control apparatus 10.

The disk control apparatus 10 includes a disk control interface unit 11, a control unit 12, and a storage unit 13, a shock sensor 14, and is connected to a disk device 20 via the disk control interface unit 11. The processing for each of these units will be described below.

The disk control interface unit 11 is means to control communication relating to various types of information exchanged with the disk device 20, whereby, for example, information such as a position signal (a signal indicating the position of the head performing writing processing with the disk device 20) is exchanged with the disk device 20.

The shock sensor 14 is a sensor to detect a shock applied to the disk device 20. Also, the shock sensor 14 outputs information relating to a detected shock as an ADC (Analog to Digital Converter) value every predetermined time interval to the next-sample projected position determining unit 12c. Specifically, as shown in FIG. 4, the shock sensor 14 detects the ADC value every predetermined time interval, monitors whether the ADC value exceeds the threshold of the shock sensor, and determines whether or not vibration or shock has occurred.

The storage unit 13 stores data and programs necessary for the various types of processing by the control unit 12. The storage unit 13 includes a head positional information storage unit 13a. The head positional information storage unit 13a stores positional information of previous time and the current time of the head which is sequentially sampled, previous next-sample projected positional information and current next-sample projected positional information, and next-sample projected position difference information which is the difference between current next-sample projected positional information and the detected next-sample projected positional information from the previous time.

In FIG. 3, number 51 indicates the position information, number 52 indicates the next-sample projected positional information, number 53 indicates the difference information of the next-sample projected positional information, number 54 indicates threshold (+) of the position information, number 55 indicates threshold (−) of the position information, number 56 indicates threshold (+) of the next-sample projected positional information, number 57 indicates threshold (−) of the next-sample projected positional information, number 58 indicates threshold (+) of the difference information of the next-sample projected positional information and number 59 indicates threshold (−) of the difference information of the next-sample projected positional information.

Specifically, as shown in FIG. 3, the head positional information storage unit 13a stores positional information 51 detected every predetermined time interval by the later-described position signal detecting unit 12a, and also, stores the next-sample projected positional information 52 and difference information 53 computed every predetermined time interval by the later-described next-sample projected positional information computing unit 12b. Also, the head positional information storage unit 13a stores positional information 51, next-sample projected positional information 52, difference information 53 of the next-sample projected positional information 52, and the above-mentioned thresholds.

The control unit 12 has internal memory to store programs regulating various types of processing procedures or the like and necessary data thereof, and executes various types of processing based on these. The control unit 12 includes a position signal detecting unit 12a, next-sample projected positional information computing unit 12b, next-sample projected position determining unit 12c, and writing processing control unit 12d are provided thereto.

The position signal detecting unit 12a detects positional information of the head performing writing processing every predetermined time interval. Specifically, the position signal detecting unit 12a receives the position signal indicating the position of the head performing writing processing from the disk device 20, and detects the positional information of the head from the position signal thereof and stores this in the head positional information storage unit 13a.

The next-sample projected positional information computing unit 12b employs the difference from the detected positional information to compute the next-sample projected positional information of the head for every detected positional information.

Specifically, the next-sample projected positional information computing unit 12b computes the value subtracting the previous sample positional information from the positional information stored in the head positional information storage unit 13a as the next-sample projected positional information of the head, and stores this in the head positional information storage unit 13a, and also, computes the next-sample projected difference information which is the difference between the next-sample projected positional information detected the current time and the next-sample projected positional information detected the previous time, and stores this in the head positional information storage unit 13a.

The next-sample projected position determining unit 12c determines whether the computed next-sample projected positional information is greater than the next-sample projected position threshold which is the predetermined threshold. Also, the next-sample projected position determining unit 12c determines whether the positional information and ADC value of the shock sensor 14 are each greater than the threshold. Specifically, the next-sample projected position determining unit 12c determines whether the positional information of the head is greater than the position threshold, and in the case the positional information of the head is the same as or smaller than the position threshold, the next-sample projected position determining unit 12c determines whether the shock sensor 14 has responded (whether the ADC value of the shock sensor 14 is greater than the shock threshold).

Consequently, in the event that the positional information of the head is greater than the position threshold, or in the case the shock sense 14 responds, the next-sample projected position determining unit 12c communicates a request to the writing processing control unit 12d to control the disk device 20 so as to immediately stop the writing processing even if partway in a sector, as a shock having occurred in the disk device 20.

Also, in the event the shock sensor 14 does not respond, the next-sample projected position determining unit 12c determines whether the next-sample projected position of the head is greater than the predetermined threshold. Consequently, in the case that the next-sample projected position of the head is greater than the predetermined threshold, the next-sample projected position determining unit 12c communicates a request to the writing processing control unit 12d to control the disk device 20 so as to stop the writing processing at a sector boundary, as a vibration having occurred in the disk device 20.

In the case that the next-sample projected position determining unit 12c determines that the next-sample projected positional information is greater than the next-sample projected position threshold, the writing processing control unit 12d controls the disk device 20 so as to stop the writing processing after the writing processing is performed to the end of a sector where writing processing is performed. Specifically, in the case that the writing processing control unit 12d receives a request from the next-sample projected position determining unit 12c to control the disk device 20 so as to immediately stop the writing processing, the writing processing control unit 12d controls the disk device 20 so as to immediately stop the writing processing. Also, in the event the writing processing control unit 12d receives a request to control the disk device 20 from the next-sample projected position determining unit 12c to control the disk device 20 as to as stop the writing processing at a sector boundary, the writing processing control unit 12d stops the writing processing at a sector boundary.

Now, the processing of the writing processing control unit 12d will be described in detail with reference to FIG. 5. As shown in the diagram, in the event that the positional information exceeds the position threshold, the writing processing control unit 12d stops the writing processing of the disk device 20 with a WTFLT (write-fault), as shown at (3) in FIG. 5.

Also, even in the case that the shock sensor 14 responds, the writing processing control unit 12d stops the writing processing of the disk device 20, similarly with the WTFLT (write-fault), as shown between (5) and (6) in FIG. 5. On the other hand, in the event that the positional information is within the position threshold, the shock sensor 14 does not respond, and the next-sample projected positional information exceeds the next-sample projected position threshold, the writing processing control unit 12d stops at a sector boundary (sector boundary function), as shown at (1) in FIG. 5.

(Processing with Disk Control Apparatus)

Figure 6:
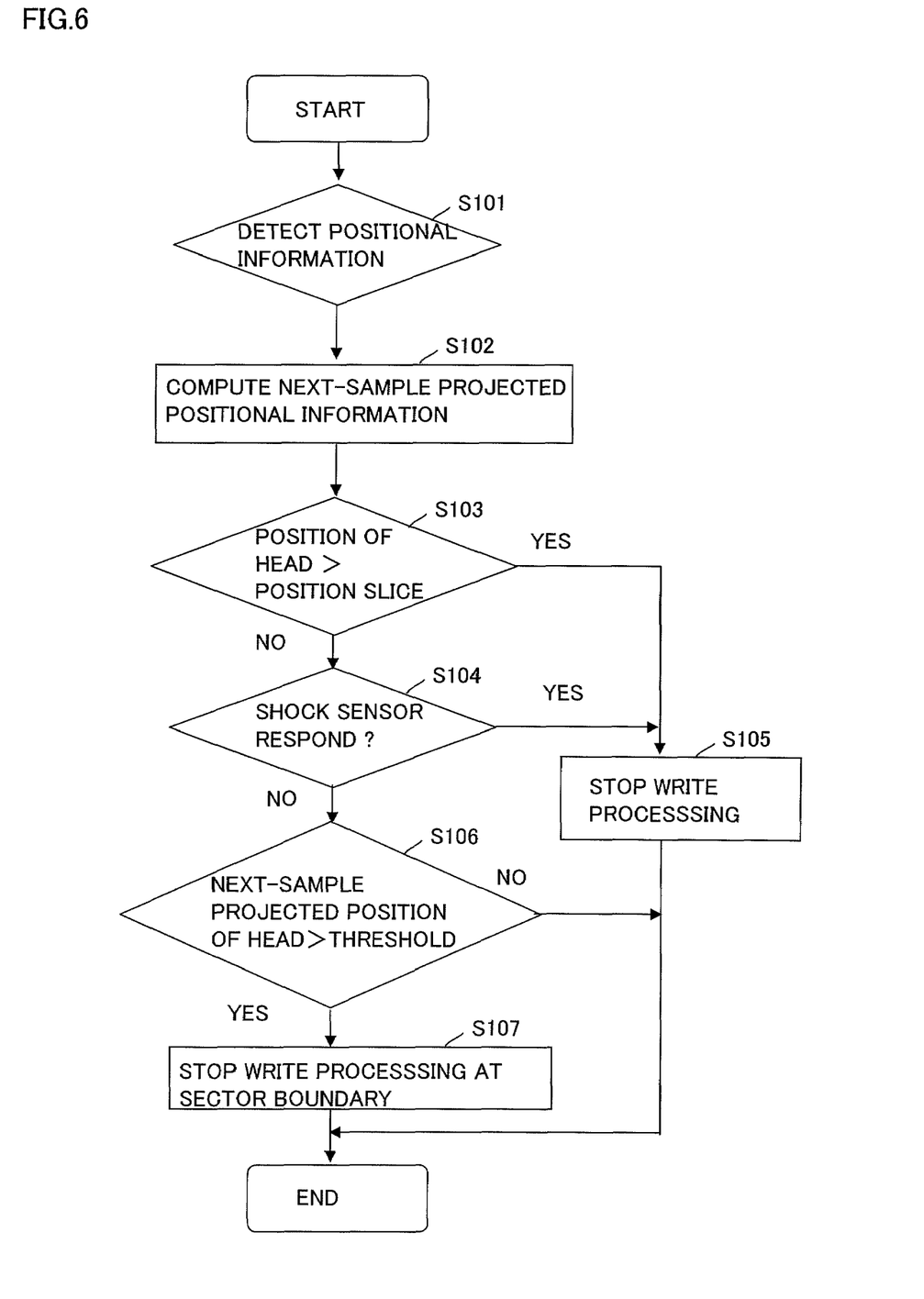
FIG. 6 is a flow chart to show the processing operation.

FIG. 6 is a flowchart showing the processing operations. As shown in the diagram, the position signal detecting unit 12 of the disk control apparatus 10 receives a position signal indicating the position of the head performing writing processing, and detects the positional information of the head from the position signal (Yes in step S101), whereby the next-sample projected positional information computing unit 12b computes the next-sample projected positional information of the head as a value wherein the positional information of the previous sample is subtracted from the positional information stored in the head positional information storage unit 13a (step S102).

The next-sample projected position determining unit 12c determines whether the positional information of the head is greater than the position threshold (step S103), and in the case the positional information of the head is not greater than the position threshold (No in step S103), determination is made as to whether the shock sensor 14 has responded (whether the ADC value of the shock sensor 14 is greater than the shock threshold) (step S104).

Also, in the case that the next-sample projected position determining unit 12c determines that the positional information of the head is greater than the position threshold (Yes in step S103), or in the case that the shock sensor 14 responds (Yes in step S104), the writing processing control unit 12d controls the disk device 20 so as to immediately stop the writing processing even if partway through a sector, as a shock having occurred to the disk device 20 (step S105).

Also, in the case that the shock sensor 14 does not respond (No in step S104), the next-sample projected position determining unit 12c determines whether the next-sample projected position of the head is greater than the predetermined threshold (step S106). Consequently, in the case that the next-sample projected position determining unit 12c determines that the next-sample projected position of the head is greater than the predetermined threshold (Yes in step S106), the writing processing control unit 12d controls the disk device 20 so as to stop the writing processing at a sector boundary since vibrations have occurred (step S107). On the other hand, in the case that the next-sample projected position determining unit 12c determines that the next-sample projected position of the head is not greater than the predetermined threshold (No in step S106), the writing processing control unit 12d does not stop the writing processing, as neither shock nor vibration has not occurred, and ends the processing.

Advantages of the First Embodiment

As described above, with the first embodiment, positional information of the head performing writing processing is detected every predetermined time interval, the next-sample projected positional information for the head which is the difference from the positional information detected in the previous time is computed for each detected positional information, determination is made as to whether the computed next-sample projected positional information is greater than the next-sample projected position threshold, and in the case that the next-sample projected positional information is determined to be greater than the next-sample projected position threshold, the disk device 20 is controlled so as to stop the writing processing after the writing processing is performed through the end of the sector where writing processing is performed, thereby ending the writing processing in sector, and prevents writing splicing, thus prevent unrecovered sectors from being generated, and can prevent the increase of unrecovered sectors in a user area. Also, with a system area wherein information relating to the operations of the storage device 3 is stored, unrecovered sectors can be prevented, whereby device startup time delays when turning the power due to retries can be prevented.

Also, according to the first embodiment, the positional information of the head is detected every predetermined time interval, employing the position signal indicating the position of the head, and computes the next-sample projected positional information for every detected positional information, whereby a position signal employed for normal disk control can be employed, and the vibration occurring in the disk device 20 can be detected without employing a new vibration detecting mechanism.

Second Embodiment

Incidentally, with the first embodiment mentioned above, a case is described wherein, in the case that the next-sample projected positional information is determined to be greater than the next-sample projected position threshold, the writing processing is stopped at a sector boundary as vibration having occurred, but there should not be limited to this, and an arrangement may be made wherein, even in a case that determination is made that the next-sample projected positional information is greater than the next-sample projected position threshold, in the event that predetermined conditions are satisfied, the writing processing is not stopped at a sector boundary, but the writing processing is stopped immediately.

That is to say, with the disk device stopping the writing processing at a sector boundary, the risk of shifted writing increases. Thus, with the disk control apparatus 10a relating to a second embodiment, an off-slice is newly provided to turn off the mechanism for stopping the writing processing at sector boundaries (sector boundary function). The off-slice indicates predetermined condition to invalidate the sector boundary function, it will be described below.

Figure 7:
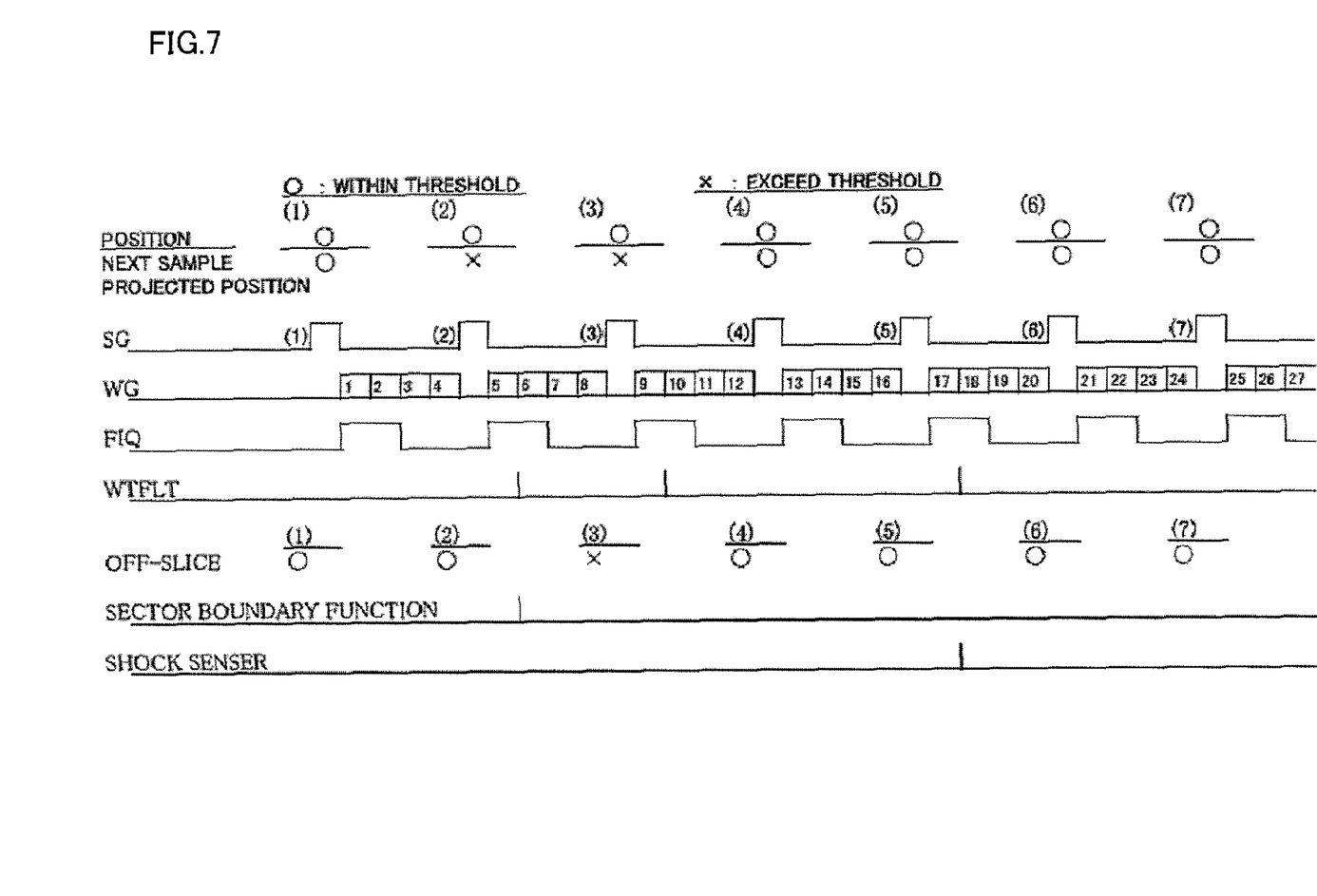
FIG. 7 is a diagram to describe the processing operation in a second embodiment.

Specifically, as shown in FIG. 7, with the second embodiment, similar to the first embodiment, in the case that the positional information is within the position threshold, and the shock sensor 14 does not respond, the writing processing control unit 12d determines whether the next-sample projected position of the head exceed the next-sample projected position threshold. Consequently, in the case that the next-sample projected position of the head exceeds the next-sample projected position threshold, the disk control apparatus further determines whether the off-slice to turn off the function to stop the writing processing at a sector boundary (sector boundary function) is exceeded. Consequently, in the case that the off-slice is exceeded, the disk control apparatus turns off the function to stop writing processing at sector boundaries, and immediately stops the writing processing, as shown at (3) in FIG. 7. Also, in the case that the off-slice is not exceeded, the disk control apparatus 10 stops the writing processing at sector boundaries, as shown at (2) in FIG. 7.

Figure 8:
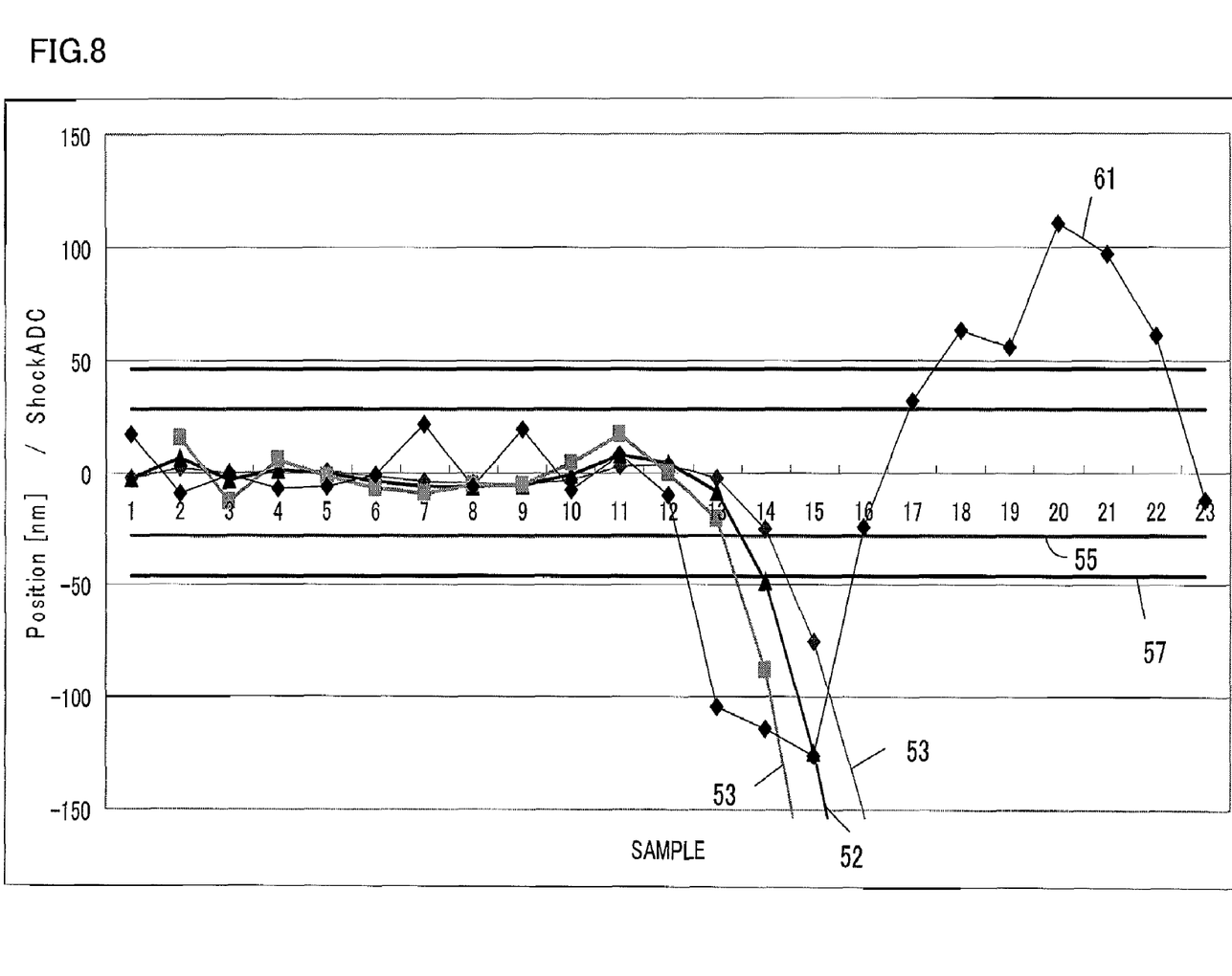
FIG. 8 is a diagram to describe an off-slice.

Now, the off-slice will be described in detail with reference to the example in FIG. 8. In FIG. 8, Number 51 indicates the position information, number 52 indicates the next-sample projected positional information, number 53 indicates the difference information of the next-sample projected positional information, number 55 indicates the position threshold, number 57 indicates the next-sample projected position threshold and number 61 indicates the shock sensor threshold. As shown in the diagram in FIG. 8, at the fourteenth point in the waveform during shock, the positional information 51 is within the position threshold 55, and the next-sample projected positional information 52 exceeds the next-sample projected position threshold 57, but if the writing processing is stopped at a sector boundary, the position swings wide at the following fifteenth point, and swing-writing can occur between the fourteenth and fifteenth points. Thus, a condition to invalidate the sector boundary function (off-slice) becomes necessary. A condition to invalidate the sector boundary is detected by control of the disk control apparatus.

As a condition to invalidate the sector boundary function, one or multiple of the following can be conceived; the disk control apparatus 10 controls to invalidate the sector boundary function when the next-sample projected position value difference is greater than or equal to a value of 1.75 times the next-sample projected position threshold, invalidates the sector boundary function when the actual position is greater than or equal to 75% of the position threshold value, invalidates the sector boundary function if the difference between the next-sample projected position threshold in the previous sample and the current position value sample this time is greater than or equal to ½ position threshold, invalidates the sector boundary function if ADC value of the shock sensor exceeds threshold decided in a stepped manner.

As described above, with the second embodiment, in the case that the next-sample projected positional information is determined to be greater than the next-sample projected position threshold, the disk device 20 is controlled to immediately stop the writing processing according to one or multiple of the relation between the next-sample projected position difference information, which is the difference between the computed current next-sample projected positional information and previous positional information, and the next-sample projected position threshold, the relation between the positional information and position threshold, the relation between the current position value sample this time and the next-sample projected position threshold in the previous sample and the degree of shock, whereby in the case that the risk of shifted writing becomes higher by stopping the writing processing at the end of the sector, the writing processing is immediately stopped, thus preventing shifted writing.

Therefore, in the case that the risk of shifted writing becomes higher by stopping the writing processing at the end of the sector, the writing processing is immediately stopped, thus preventing shifted writing.

Third Embodiment

There may be various difference embodiments other than those embodiments described above. Thus, a different embodiment will be described below as a disk control apparatus relating to a third embodiment.

System Configuration, Etc.

The various configuration elements of the various devices shown in the diagrams are functionally conceptual, and are not necessarily configured as physically drawn. That is to say, the specific states of dispersion/integration of the various devices are not limited to that shown in the diagrams, and according to load or usage for each time, all or a portion of the devices may be configured to be functionally or physically dispersed/integrated in arbitrary units. For example, an arrangement may be made to integrate the disk control apparatus 10 and disk device 20 shown in FIG. 2 as a storage device, disk device, or disk control apparatus.

Also, the information including processing procedures, control procedures, or specific names, various types of data or parameters as written in the document above or shown in the diagrams, can be changed arbitrarily except in the case of being specified. For example, the value of the next-sample projected position threshold, which is the predetermined threshold value, can be arbitrarily changed.

Figure 9:
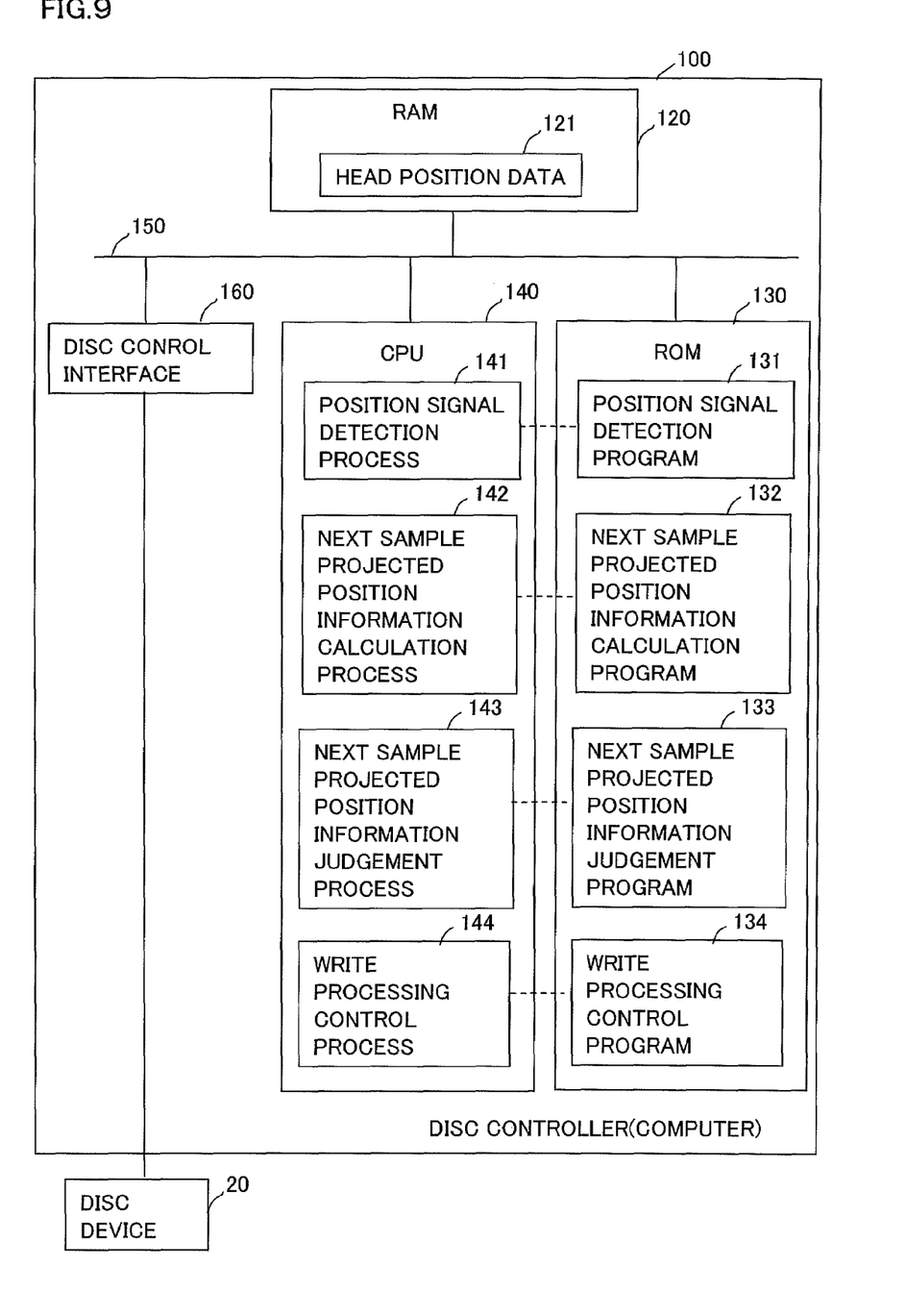
FIG. 9 is a diagram illustrating a computer to execute a control program.

Note that the various types of processing described with the above embodiments can be realized by executing a program arranged beforehand with a CPU (Central Processing Unit) (or a processing device such as an MCU (Micro Control Unit) or MPU (Micro Processing Unit)). An example of a computer to execute a program having similar functions as the above-described embodiments will be described with reference to FIG. 9. FIG. 9 is a diagram illustrating a computer to execute a control program.

As shown in the diagram, a CPU 140 which is a computer 100 serving as the disk control apparatus is made up of a RAM 120, ROM 130, and so forth which are connected by a bus 150. A high performance CPU with a HDC (hard disk controller) and a logic circuit may be employed as the CPU.

The ROM 130 has a writing control program to activate functions similar to the embodiments described above, i.e. as shown in FIG. 9, has a position signal detecting program 131, next-sample projected positional information computing program 132, next-sample projected position determining program 133, and writing processing control program 134 stored therewithin beforehand. Note that as with the components of the disk control apparatus 10 shown in FIG. 2, the programs 131 through 134 may be integrated or distributed as appropriate.

The CPU 140 reads the programs 131 through 134 from the ROM 130 and executes these, whereby as shown in FIG. 9, the various programs 131 through 134 function as a position signal detecting process 141, next-sample projected positional information computing process 142, next-sample projected position determining process 143, and writing processing control process 144. The various processes 141 through 144 each correspond to the position signal detecting unit 12a, next-sample projected positional information computing unit 12b, next-sample projected position determining unit 12c, and writing processing control unit 12d, shown in FIG. 2.

Also, the CPU 140 reads the head position data 121 and stores this in the RAM 120, and executes processing to control the disk device based on the head position data 121 stored in the RAM 120. Also, although unshown, the processing described specifically with the first and second embodiments can be similarly executed with program processing. Note that cases wherein a CPU within a disk control apparatus executes a program has been described, but there should not be limited to this, and CPU provided within the disk device may be arranged to execute the program.

What is claimed is:

1. A control apparatus for controlling a storage device, said storage device performing writing processing to write data into a storage medium by a head, said control apparatus comprising:
    a processor to control the control apparatus according to a process including:
        detecting positional information of the head every predetermined time interval,
        determining whether the positional information is not greater than a position threshold;
        computing next-sample projected positional information of the head on the basis of the positional information detected current time and difference between the positional information detected previous time and the positional information detected current time upon determining the positional information being not greater than the position threshold;
        determining whether the computed next-sample projected positional information is greater than next-sample projected position threshold; and
        controlling the storage device to stop the writing processing after writing processing is performed to the end of the sector, upon determining the next-sample projected positional information being greater than the next-sample projected position threshold.

2. The control apparatus according to claim 1, wherein the positional information of the head is detected on basis of a position signal indicating the position of the head every predetermined time interval, and the next-sample projected positional information is computed for every positional information detected.

3. The control apparatus according to claim 1, wherein controlling process is further to control the storage device so as to immediately stop the writing processing by detecting predetermined condition to invalidate performance of writing processing to the end of the sector upon determining the next-sample projected positional information being greater than the next-sample projected position threshold.

4. A storage apparatus, comprising:
    a storage device for performing writing processing to write data into a storage medium by a head; and
    a control apparatus for writing the data into the storage device, said control apparatus comprising a processor to control the control apparatus according to a process including,
        detecting positional information of the head every predetermined time interval,
        determining whether the positional information is not greater than a position threshold;
        computing next-sample projected positional information of the head on the basis of the positional information detected current time and difference between the positional information detected previous time and the positional information detected current time upon determining the positional information being not greater than the position threshold;
        determining whether the computed next-sample projected positional information is greater than next-sample projected position threshold; and
        controlling the storage device to stop the writing processing after the writing processing is performed to the end of the sector, upon determining the next-sample projected positional information being greater than the next-sample projected position threshold.

5. The storage apparatus according to claim 4, wherein the positional information of the head is detected on basis of a position signal indicating the position of the head every predetermined time interval, and the next-sample projected positional information is computed for every positional information detected.

6. The storage apparatus according to claim 5, wherein controlling process is further to control the storage device so as to immediately stop the writing processing by detecting predetermined condition to invalidate performance of writing processing to the end of the sector upon determining the next-sample projected positional information being greater than the next-sample projected position threshold.

7. A writing control method for performing writing processing to write data into a storage medium by a head in a storage device, comprising the steps of
   detecting positional information of the head every predetermined time interval,
   determining whether the positional information is not greater than a position threshold;
   computing next-sample projected positional information of the head on the basis of the positional information detected current time and difference between the positional information detected previous time and the positional information detected current time upon determining the positional information being not greater than the position threshold;
   determining whether the computed next-sample projected positional information is greater than next-sample projected position threshold; and
   controlling the storage device to stop the writing processing after writing processing is performed to the end of the sector, upon determining the next-sample projected positional information being greater than the next-sample projected position threshold.

8. The writing control method according to claim 7, wherein the positional information of the head is detected on basis of a position signal indicating the position of the head every predetermined time interval, and the next-sample projected positional information is computed for every positional information detected.

9. The writing control method according to claim 7, wherein controlling step is further to control the storage device so as to immediately stop the writing processing by detecting predetermined condition to invalidate performance of writing processing to the end of the sector upon determining the next-sample projected positional information being greater than the next-sample projected position threshold.

* * * * *